United States Patent
Mayya et al.

(10) Patent No.: US 11,050,588 B2
(45) Date of Patent: Jun. 29, 2021

(54) METHOD AND SYSTEM OF OVERLAY FLOW CONTROL

(71) Applicant: Nicira, Inc., Palo Alto, CA (US)

(72) Inventors: Ajit Ramachandra Mayya, Saratoga, CA (US); Parag Pritam Thakore, Los Gatos, CA (US); Stephen Craig Connors, San Jose, CA (US); Steven Michael Woo, Los Altos, CA (US); Sunil Mukundan, Chennai (IN); Thomas Harold Speeter, San Martin, CA (US); Vipin Kumar, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 24 days.

(21) Appl. No.: 16/656,555

(22) Filed: Oct. 17, 2019

(65) Prior Publication Data

US 2020/0119952 A1 Apr. 16, 2020

Related U.S. Application Data

(63) Continuation of application No. 15/624,532, filed on Jun. 15, 2017, now Pat. No. 10,454,714, and a (Continued)

(51) Int. Cl.
*H04L 12/66* (2006.01)
*H04L 29/08* (2006.01)
(Continued)

(52) U.S. Cl.
CPC .......... *H04L 12/66* (2013.01); *H04L 41/5041* (2013.01); *H04L 41/5096* (2013.01);
(Continued)

(58) Field of Classification Search
None
See application file for complete search history.

(56) References Cited

U.S. PATENT DOCUMENTS

| 5,652,751 A | 7/1997 | Sharony |
| 5,909,553 A | 6/1999 | Campbell et al. |

(Continued)

FOREIGN PATENT DOCUMENTS

| EP | 1912381 A1 | 4/2008 |
| EP | 3041178 A1 | 7/2016 |

(Continued)

OTHER PUBLICATIONS

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

(Continued)

*Primary Examiner* — Saumit Shah
(74) *Attorney, Agent, or Firm* — Adeli LLP

(57) ABSTRACT

In one aspect, A computerized method of a gateway distributing routes learned through routing protocols (RP) into a Border Gateway Protocol (BGP) includes the step of providing a first gateway that receives a route over a routing protocol. The method includes the step of with the first gateway, redistributing the route to one or more peer routers as a BGP route based on one or more specified criteria. The method includes the step of setting a gateway precedence based on the redistribution of the route to the one or more peer routers as the BGP route. The method includes the step of, based on the gateway precedence, setting a second gateway to automatically redistribute the route with different priorities to influence steering of traffic to a preferred gateway.

20 Claims, 13 Drawing Sheets

Related U.S. Application Data continuation-in-part of application No. 14/321,818, filed on Jul. 2, 2014, now Pat. No. 9,722,815.

(60) Provisional application No. 62/457,816, filed on Feb. 11, 2017, provisional application No. 61/844,822, filed on Jul. 10, 2013.

(51) Int. Cl.
*H04L 12/851* (2013.01)
*H04L 12/715* (2013.01)
*H04L 12/24* (2006.01)
*H04L 12/26* (2006.01)
*H04L 12/751* (2013.01)
*H04L 12/723* (2013.01)
*H04L 12/46* (2006.01)

(52) U.S. Cl.
CPC .......... *H04L 43/0894* (2013.01); *H04L 45/02* (2013.01); *H04L 45/04* (2013.01); *H04L 47/24* (2013.01); *H04L 69/325* (2013.01); *H04L 45/50* (2013.01); *H04L 2012/4629* (2013.01)

(56) References Cited

U.S. PATENT DOCUMENTS

| | | |
|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,566,452 B1 | 10/2013 | Goodwin et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,137,334 B2 | 9/2015 | Zhou |
| 9,154,327 B1 | 10/2015 | Marino et al. |
| 9,306,949 B1 | 4/2016 | Richard et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,559,951 B1 | 1/2017 | Sajassi et al. |
| 9,602,389 B1 | 3/2017 | Maveli et al. |
| 9,608,962 B1 | 3/2017 | Chang |
| 9,621,460 B2 | 4/2017 | Mehta et al. |
| 9,641,551 B1 | 5/2017 | Kariyanahalli |
| 9,665,432 B2 | 5/2017 | Kruse et al. |
| 9,686,127 B2 | 6/2017 | Ramachandran et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,906,401 B1 | 2/2018 | Rao |
| 9,930,011 B1 | 3/2018 | Clemons, Jr. et al. |
| 9,942,787 B1 | 4/2018 | Tillotson |
| 10,038,601 B1 | 7/2018 | Becker et al. |
| 10,057,183 B2 | 8/2018 | Salle et al. |
| 10,057,294 B2 | 8/2018 | Xu |
| 10,135,789 B2 | 11/2018 | Mayya et al. |
| 10,142,226 B1 | 11/2018 | Wu et al. |
| 10,178,032 B1 | 1/2019 | Freitas |
| 10,187,289 B1 | 1/2019 | Chen et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,326,830 B1 | 6/2019 | Singh |
| 10,348,767 B1 | 7/2019 | Lee et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,574,528 B2 | 2/2020 | Mayya et al. |
| 10,594,516 B2 | 3/2020 | Cidon et al. |
| 10,594,659 B2 | 3/2020 | El-Moussa et al. |
| 10,608,844 B2 | 3/2020 | Cidon et al. |
| 10,637,889 B2 | 4/2020 | Ermagan et al. |
| 10,666,460 B2 | 5/2020 | Cidon et al. |
| 10,686,625 B2 | 6/2020 | Cidon et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,805,114 B2 | 10/2020 | Cidon et al. |
| 10,805,272 B2 | 10/2020 | Mayya et al. |
| 10,841,131 B2 | 11/2020 | Cidon et al. |
| 2002/0198840 A1 | 12/2002 | Banka et al. |
| 2003/0088697 A1 | 5/2003 | Matsuhira |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |

(56) References Cited

U.S. PATENT DOCUMENTS

| | | |
|---|---|---|
| 2004/0224771 A1 | 11/2004 | Chen et al. |
| 2005/0078690 A1 | 4/2005 | DeLangis |
| 2005/0154790 A1 | 7/2005 | Nagata et al. |
| 2005/0172161 A1 | 8/2005 | Cruz et al. |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1* | 8/2006 | Naseh .................. H04L 45/04 370/225 |
| 2007/0064604 A1 | 3/2007 | Chen et al. |
| 2007/0064702 A1 | 3/2007 | Bates et al. |
| 2007/0091794 A1 | 4/2007 | Filsfils et al. |
| 2007/0121486 A1 | 5/2007 | Guichard et al. |
| 2007/0130325 A1 | 6/2007 | Lesser |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0080509 A1 | 4/2008 | Khanna et al. |
| 2008/0095187 A1 | 4/2008 | Jung et al. |
| 2008/0144532 A1 | 6/2008 | Chamarajanagar et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Klessig et al. |
| 2009/0154463 A1 | 6/2009 | Hines et al. |
| 2009/0247204 A1 | 10/2009 | Sennett et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0191884 A1 | 7/2010 | Holenstein et al. |
| 2010/0223621 A1 | 9/2010 | Joshi et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0221955 A1 | 8/2012 | Raleigh et al. |
| 2012/0250682 A1 | 10/2012 | Vincent et al. |
| 2012/0250686 A1 | 10/2012 | Vincent et al. |
| 2012/0300615 A1 | 11/2012 | Kempf et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051399 A1 | 2/2013 | Zhang et al. |
| 2013/0054763 A1 | 2/2013 | Merwe et al. |
| 2013/0103834 A1 | 4/2013 | Dzerve et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0173788 A1 | 7/2013 | Song |
| 2013/0182712 A1 | 7/2013 | Aguayo et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0283364 A1 | 10/2013 | Chang et al. |
| 2013/0286846 A1 | 10/2013 | Atlas et al. |
| 2013/0301642 A1 | 11/2013 | Radhakrishnan et al. |
| 2013/0308444 A1 | 11/2013 | Sem-Jacobsen et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0064283 A1 | 3/2014 | Balus et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0173113 A1 | 6/2014 | Vemuri et al. |
| 2014/0173331 A1 | 6/2014 | Martin et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0016249 A1 | 1/2015 | Mukundan et al. |
| 2015/0029864 A1 | 1/2015 | Raileanu et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0172121 A1 | 6/2015 | Farkas et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0271104 A1 | 9/2015 | Chikkamath et al. |
| 2015/0312142 A1 | 10/2015 | Barabash et al. |
| 2015/0334696 A1 | 11/2015 | Gu et al. |
| 2015/0349978 A1 | 12/2015 | Wu et al. |
| 2015/0350907 A1 | 12/2015 | Timariu et al. |
| 2015/0363733 A1 | 12/2015 | Brown |
| 2015/0372943 A1 | 12/2015 | Hasan et al. |
| 2015/0372982 A1 | 12/2015 | Herle |

(56) References Cited

U.S. PATENT DOCUMENTS

| | | |
|---|---|---|
| 2015/0381407 A1 | 12/2015 | Wang et al. |
| 2015/0381493 A1 | 12/2015 | Bansal et al. |
| 2016/0035183 A1 | 2/2016 | Buchholz et al. |
| 2016/0036924 A1 | 2/2016 | Koppolu et al. |
| 2016/0037434 A1 | 2/2016 | Gopal et al. |
| 2016/0072669 A1 | 3/2016 | Saavedra |
| 2016/0080502 A1 | 3/2016 | Yadav et al. |
| 2016/0105392 A1 | 4/2016 | Thakkar et al. |
| 2016/0105471 A1 | 4/2016 | Nunes et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0218947 A1 | 7/2016 | Hughes et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261639 A1 | 9/2016 | Xu |
| 2016/0269926 A1 | 9/2016 | Sundaram |
| 2016/0308762 A1* | 10/2016 | Teng .................. H04L 12/4641 |
| 2016/0315912 A1 | 10/2016 | Mayya et al. |
| 2016/0323377 A1 | 11/2016 | Einkauf et al. |
| 2016/0352588 A1 | 12/2016 | Subbarayan et al. |
| 2016/0359738 A1 | 12/2016 | Sullenberger et al. |
| 2016/0366187 A1 | 12/2016 | Kamble |
| 2016/0380886 A1 | 12/2016 | Blair et al. |
| 2017/0005986 A1 | 1/2017 | Bansal et al. |
| 2017/0012870 A1 | 1/2017 | Blair et al. |
| 2017/0019428 A1* | 1/2017 | Cohn .................. H04L 65/1036 |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034129 A1 | 2/2017 | Sawant et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0093625 A1 | 3/2017 | Pera et al. |
| 2017/0097841 A1 | 4/2017 | Chang et al. |
| 2017/0104755 A1 | 4/2017 | Arregoces et al. |
| 2017/0118173 A1 | 4/2017 | Arramreddy et al. |
| 2017/0123939 A1 | 5/2017 | Maheshwari et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Nadella et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0289002 A1 | 10/2017 | Ganguli et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0374174 A1 | 12/2017 | Evens et al. |
| 2018/0006995 A1 | 1/2018 | Bickhart et al. |
| 2018/0007123 A1 | 1/2018 | Cheng et al. |
| 2018/0014051 A1 | 1/2018 | Phillips et al. |
| 2018/0034668 A1 | 2/2018 | Mayya et al. |
| 2018/0041425 A1 | 2/2018 | Zhang |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063233 A1 | 3/2018 | Park |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0114569 A1 | 4/2018 | Strachan et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028552 A1 | 1/2019 | Johnson et al. |
| 2019/0036810 A1 | 1/2019 | Michael et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0140889 A1 | 5/2019 | Mayya et al. |
| 2019/0140890 A1 | 5/2019 | Mayya et al. |

(56) References Cited

U.S. PATENT DOCUMENTS

| | | | |
|---|---|---|---|
| 2019/0158605 | A1 | 5/2019 | Markuze et al. |
| 2019/0199539 | A1 | 6/2019 | Deng et al. |
| 2019/0238364 | A1 | 8/2019 | Boutros et al. |
| 2019/0238449 | A1 | 8/2019 | Michael et al. |
| 2019/0238450 | A1 | 8/2019 | Michael et al. |
| 2019/0268421 | A1 | 8/2019 | Markuze et al. |
| 2019/0280962 | A1 | 9/2019 | Michael et al. |
| 2019/0280963 | A1 | 9/2019 | Michael et al. |
| 2019/0280964 | A1 | 9/2019 | Michael et al. |
| 2019/0313907 | A1 | 10/2019 | Khachaturian et al. |
| 2019/0319847 | A1 | 10/2019 | Nahar et al. |
| 2019/0364099 | A1 | 11/2019 | Thakkar et al. |
| 2019/0372888 | A1 | 12/2019 | Michael et al. |
| 2019/0372889 | A1 | 12/2019 | Michael et al. |
| 2019/0372890 | A1 | 12/2019 | Michael et al. |
| 2020/0014615 | A1 | 1/2020 | Michael et al. |
| 2020/0014616 | A1 | 1/2020 | Michael et al. |
| 2020/0014661 | A1 | 1/2020 | Mayya et al. |
| 2020/0021514 | A1 | 1/2020 | Michael et al. |
| 2020/0021515 | A1 | 1/2020 | Michael et al. |
| 2020/0036624 | A1 | 1/2020 | Michael et al. |
| 2020/0059459 | A1 | 2/2020 | Abraham et al. |
| 2020/0092207 | A1 | 3/2020 | Sipra et al. |
| 2020/0106696 | A1 | 4/2020 | Michael et al. |
| 2020/0106706 | A1 | 4/2020 | Mayya et al. |
| 2020/0127905 | A1 | 4/2020 | Mayya et al. |
| 2020/0153736 | A1 | 5/2020 | Liebherr et al. |
| 2020/0218558 | A1 | 7/2020 | Sreenath et al. |
| 2020/0235990 | A1 | 7/2020 | Janakiraman et al. |
| 2020/0235999 | A1 | 7/2020 | Mayya et al. |
| 2020/0236046 | A1 | 7/2020 | Jain et al. |
| 2020/0244721 | A1 | 7/2020 | S et al. |
| 2020/0267184 | A1 | 8/2020 | Vera-Schockner |
| 2020/0296026 | A1 | 9/2020 | Michael et al. |
| 2020/0366530 | A1 | 11/2020 | Mukundan et al. |
| 2020/0366562 | A1 | 11/2020 | Mayya et al. |

FOREIGN PATENT DOCUMENTS

| | | |
|---|---|---|
| EP | 3509256 A1 | 7/2019 |
| WO | 03073701 | 9/2003 |
| WO | 2012167184 A2 | 12/2012 |
| WO | 2017083975 A1 | 5/2017 |
| WO | 2019070611 A1 | 4/2019 |
| WO | 2019094522 A1 | 5/2019 |
| WO | 2020018704 A1 | 1/2020 |
| WO | 2020101922 A1 | 5/2020 |

OTHER PUBLICATIONS

Petition for Post-Grant Review of U.S. Pat. No. 9,722,815, filed May 1, 2018, 106 pages.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Fortz, Bernard, et al., "Internet Traffic Engineering by Optimizing OSPF Weights," Proceedings IEEE Infocom 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Non-Published Commonly Owned U.S. Appl. No. 17/068,603, filed Oct. 12, 2020, 37 pages, Nicira, Inc.

Non-Published Commonly Owned U.S. Appl. No. 16/818,862 (MODE.P001C1), filed Mar. 13, 2020, 198 pages, The Mode Group.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

Non-Published Commonly Owned U.S. Appl. No. 16/945,700, filed Jul. 31, 2020, 37 pages, Nicira, Inc.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

* cited by examiner

Overlay Flow Control

VRF Global Routing Preferences

Preferred VPN Exits

| Default Priority |
|---|
| 1. Edge |
| 2. Partner Gateway |
| 3. Router |
| 4. Hub |

Edit...

Global Advertise Flags

Edge
Assigned
- ☑ Static Routes
- ☑ Connected Routes

OSPF
- ☒ Advertise External
- ☑ Advertise InterArea
- ☑ Advertise IntraArea

Hubs
Assigned
- ☑ Static Routes
- ☑ Connected Routes

OSPF
- ☒ Advertise External
- ☑ Advertise InterArea
- ☑ Advertise IntraArea

Partner Gateways
Assigned
- ☑ Static Routes

Search...  ▾ | ⓘ | ☐Cols | ✗Reset View | ⟳Refresh | ⬇CSV | Display 40 items | 0 selected ▾ | ⌁Actions | Created On

| Modify | Subnet | Preferred VPN Exits ⓘ | Route Type ⓘ | Last Update ⓘ |
|---|---|---|---|---|
| Edit | 172.16.0.0/12 | Mountain View HQ | Static | |
| Edit | 172.17.1.0/24 | Chennai BO | Static | |
| Edit | 172.17.8.0/24 | Chennai BO | Static | |
| Edit | 172.17.10.0/24 | Chennai BO | Connected | |
| Edit | 172.17.100.0/24 | Chennai BO | Static | |
| Edit | 172.17.200.0/24 | AWS US-East (vpn-0828c561) | NVS | |
| Edit | 172.20.0.0/16 | none | Static (Chennai BO) | |
| Edit | 172.20.100.0/24 | Hurricane Electric (gw1-usca2.tunnel40x) | NVS | |
| Edit | 172.24.0.0/16 | Mountain View HQ | Connected | |
| Edit | 172.27.0.0/24 | | | |

METHOD AND SYSTEM OF OVERLAY FLOW CONTROL

CROSS-REFERENCE TO RELATED APPLICATIONS

This application is a continuation application of U.S. patent application Ser. No. 15/624,532, filed Jun. 15, 2017, now published as U.S. Patent Publication 2018/0034668. U.S. patent application Ser. No. 15/624,532 claims priority to U.S. Provisional Patent Application No. 62/457,816, filed on 11 Feb. 2017. U.S. patent application Ser. No. 15/624,532 also claims priority to and is a continuation-in-part of U.S. patent application Ser. No. 14/321,818, filed on Jul. 2, 2014, now issued as U.S. Pat. No. 9,722,815. U.S. patent application Ser. No. 14/321,818 claims priority to U.S. Provisional Patent Application 61/844,822, filed Jul. 10, 2013. U.S. patent application Ser. No. 15/624,532, now published as U.S. Patent Publication 2018/0034668, U.S. patent application Ser. No. 14/321,818, now issued as U.S. Pat. No. 9,722,815, and U.S. Provisional Patent Application 62/457,816, are incorporated by reference in its their entirety.

FIELD OF THE INVENTION

This application relates generally to computer networking, and more specifically to a system, article of manufacture and method of establishing and managing overlay flow control in a computer network.

DESCRIPTION OF THE RELATED ART

Employees working in branch offices of an Enterprises typically need to access resources that are located in another branch office. In some cases, these are located in the Enterprise Data Center, which is a central location for resources. Access to these resources is typically obtained by using a site-to-site VPN, which establishes a secure connection over a public network (e.g. the Internet, etc.). There may be dedicated computer equipment in the branch office, the other branch office and/or Data Center which establishes and maintains the secure connection. These types of site-to-site VPNs can be setup one at a time and can be resource intensive to set up and maintain.

BRIEF SUMMARY OF THE INVENTION

In one aspect, A computerized method of a gateway distributing routes learned through routing protocols (RP) into a Border Gateway Protocol (BGP) includes the step of providing a first gateway that receives a route over a routing protocol. The method includes the step of with the first gateway, redistributing the route to one or more peer routers as a BGP route based on one or more specified criteria. The method includes the step of setting a gateway precedence based on the redistribution of the route to the one or more peer routers as the BGP route. The method includes the step of, based on the gateway precedence, setting a second gateway to automatically redistribute the route with different priorities to influence steering of traffic to a preferred gateway.

BRIEF DESCRIPTION OF THE DRAWINGS

FIG. 9 illustrates an example screen shot of an Overlay Flow Control table, according to some embodiments.

Figure 1:
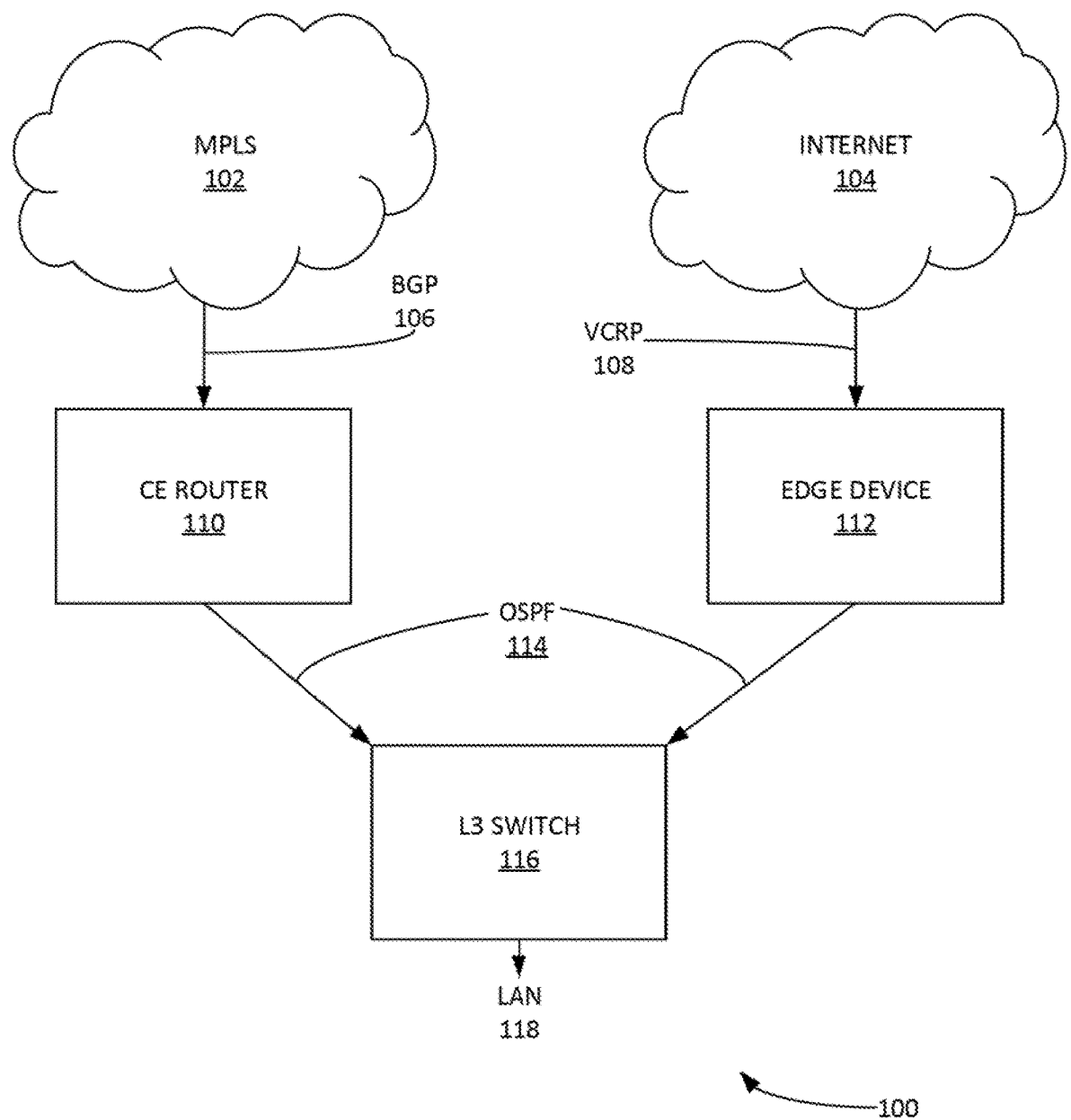
FIG. 1 illustrates an example network for implementing Overlay Flow Control, according to some embodiments.

The Figures described above are a representative set, and are not exhaustive with respect to embodying the invention.

DESCRIPTION

Disclosed are a system, method, and article of manufacture for overlay flow control. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Border Gateway Protocol (BGP) can be a standardized exterior gateway protocol designed to exchange routing and reachability information among autonomous systems (AS) on the Internet.

Cloud computing can involve deploying groups of remote servers and/or software networks that allow centralized data storage and online access to computer services or resources. These groups of remote serves and/or software networks can be a collection of remote computing services.

CE router (customer edge router) can be a router located on the customer premises that provides an Ethernet interface between the customer's LAN and the provider's core network. CE routers can be a component in an MPLS architecture.

Customer-premises equipment (CPE) can be any terminal and associated equipment located at a subscriber's premises and connected with a carrier's telecommunication channel at the demarcation point.

Edge device can be a device that provides an entry point into enterprise or service provider core networks. An edge device can be software running in a virtual machine (VM) located in a branch office and/or customer premises.

Firewall can be a network security system that monitors and controls the incoming and outgoing network traffic based on predetermined security rules.

Flow can be a grouping of packets that match a five (5) tuple which is a combination of Source IP Address (SIP), Destination IP Address (DIP), L4 Source Port (SPORT) and L4 Destination Port (DPORT) and the L4 protocol (PROTO).

Forward error correction (FEC) (e.g. channel coding) can be a technique used for controlling errors in data transmission over unreliable or noisy communication channels.

Deep learning can be a type of machine learning based on a set of algorithms that attempt to model high-level abstractions in data by using model architectures, with complex structures or otherwise, composed of multiple non-linear transformations Deep Packet Inspection (DPI) can be the ability to analyze the different layers of a packet on the network.

Gateway can be a node (e.g. a router) on a computer network that serves as an access point to another network.

Internet Protocol Security (IPsec) can be a protocol suite for securing Internet Protocol (IP) communications by authenticating and encrypting each IP packet of a communication session.

Multi-Exit Discriminator (MED) can be an attribute of the Border Gateway Protocol used to influence route preference.

Multiprotocol Label Switching (MPLS) can be a mechanism in telecommunications networks that directs data from one network node to the next based on short path labels rather than long network addresses, thus avoiding complex lookups in a routing table.

Orchestrator can include a software component that provides multi-tenant and role based centralized configuration management and visibility.

Open Shortest Path First (OSPF) can be a routing protocol for Internet Protocol (IP) networks. OSPF ca use a link state routing (LSR) algorithm and falls into the group of interior gateway protocols (IGPs), operating within a single autonomous system (AS).

Overlay Flow Control table can be a user interface on the Orchestrator which displays all routes in the customer and allows for editing routing attributes, preferred exits, and default behaviors for future learned routes.

Quality of Service (QoS) can include the ability to define a guaranteed set of actions such as routing, resource constraints (e.g. bandwidth, latency etc.).

Software as a service (SaaS) can be a software licensing and delivery model in which software is licensed on a subscription basis and is centrally hosted.

Tunneling protocol can allow a network user to access or provide a network service that the underlying network does not support or provide directly.

Virtual Desktop Infrastructure (VDI) is a desktop-oriented service that hosts user desktop environments on remote servers and/or blade PCs. Users access the desktops over a network using a remote display protocol.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Voice over IP (VoIP) can a methodology and group of technologies for the delivery of voice communications and multimedia sessions over Internet Protocol (IP) networks, such as the Internet.

Additional example definitions are provided herein.

Examples Systems and Processes of Overlay Flow Control

In order to integrate into customer environments with minimal configuration required on existing devices, an Edge device and a gateway system can support dynamic routing protocols. In order to facilitate simplified use and management of these dynamic routing protocols such as OSPF. Accordingly, various Overlay Flow Control methods and system can be implemented. These can provide a user a single, simple point of configuration for all routes in a network without requiring changes to the protocol configuration itself.

FIG. 1 illustrates an example network 100 for implementing Overlay Flow Control, according to some embodiments. Network 100 provides an example topology with a single L3 switch 116 that is connected on the LAN 118 side of an edge device 112 (e.g. a Velocloud® edge device, etc.). L3 switch 116 can also be connected to a CE router 110. CE router 110 can redistribute an MPLS 102 and/or BGP 106 routes into OSPF 114 routes. In this topology, the edge device can learn routes from the L3 switch 116. Edge device 112 can inject its own routes as well. Network 100 can be communicatively coupled with the Internet 104 utilizing routing protocol 108 (e.g. Velocloud® routing protocol (VCRP), etc.). CE router 110 can be a customer-edge (CE) router. It is noted that in some examples, BGP can prefer routes with the shortest AS-path. The AS-path-prepend adds the AS number to the beginning of the AS path to make a shorter path appear longer and therefore less preferable.

Figure 2:
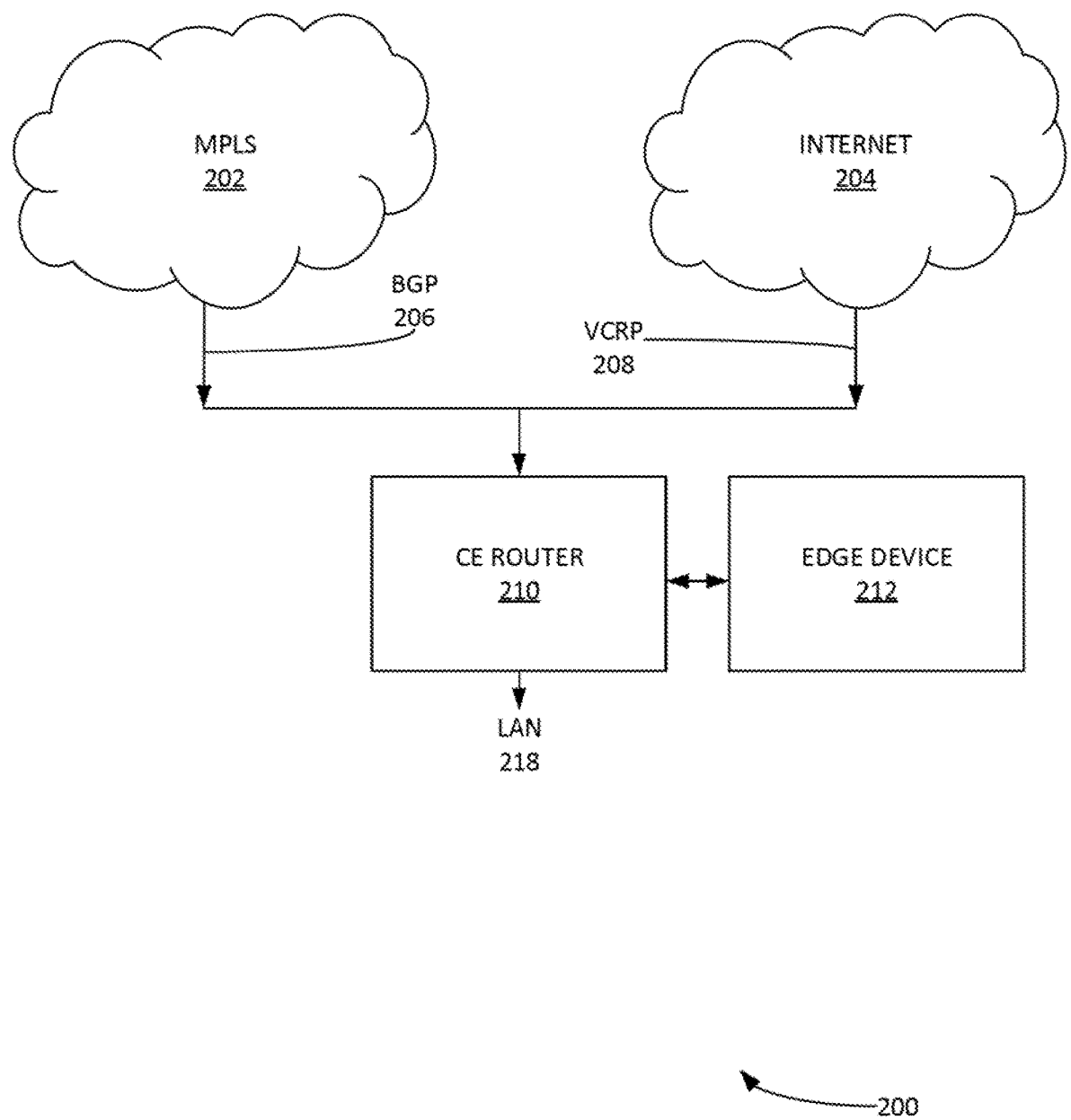
FIG. 2 illustrates another example network for implementing Overlay Flow Control, according to some embodiments.

FIG. 2 illustrates another example network 200 for implementing Overlay Flow Control, according to some embodiments. Network 100 provides an example topology where the Internet 204 and MPLS 202 links both terminate on a single router 210. Edge device 212 can be deployed in a 'one-arm' configuration attached to CE router 210. The edge device can redistribute an MPLS 102 and/or BGP 106 routes into OSPF 114 routes. In this topology, edge device 212 can learn routes from the L3 switch 116. In this example topology, edge device 212 can learn routes from the CE router 210, as well as injecting its own routes.

Figure 3:
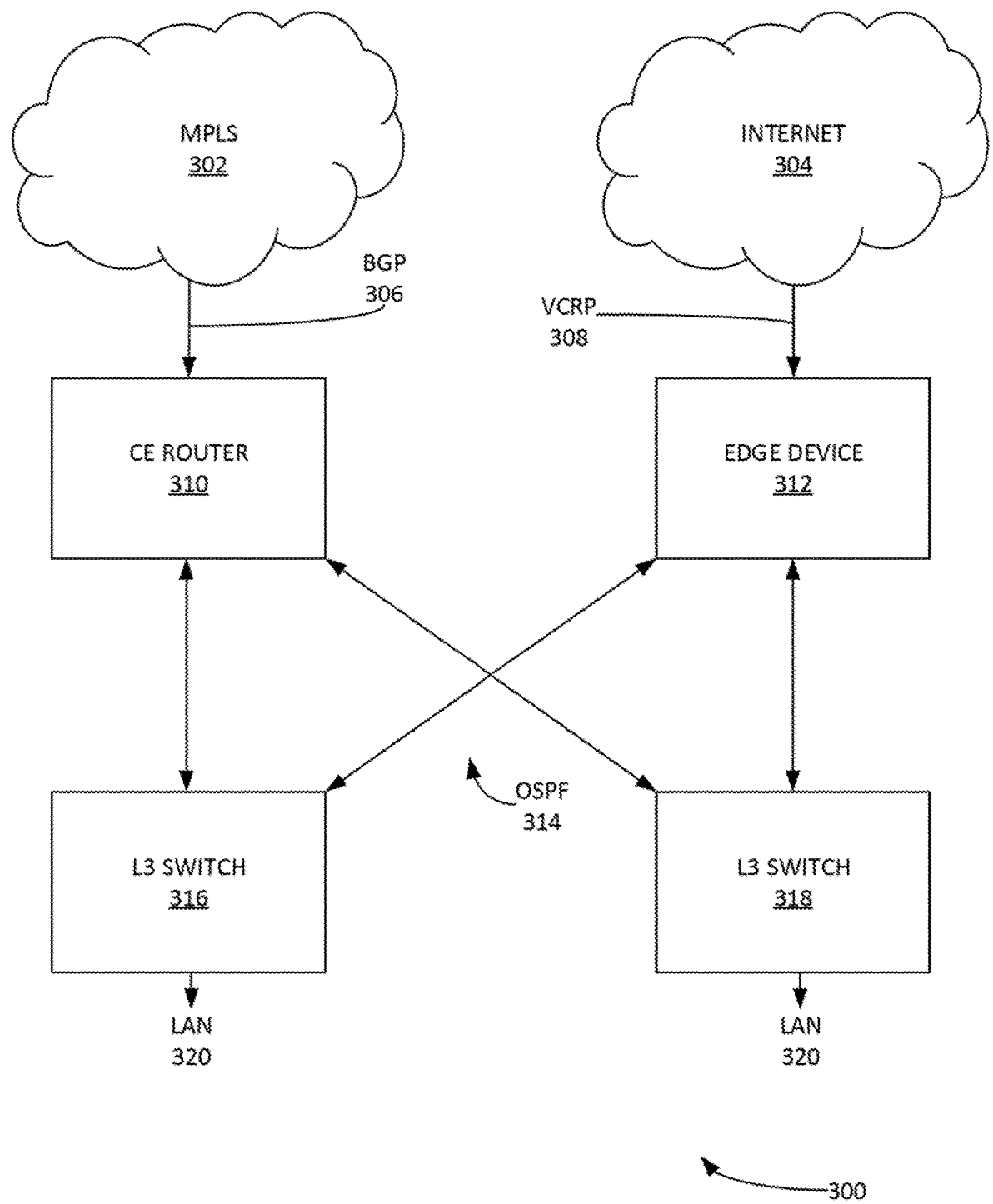
FIG. 3 illustrates another example network for implementing Overlay Flow Control, according to some embodiments.

FIG. 3 illustrates another example network 300 for implementing Overlay Flow Control, according to some embodiments. In an example large branch site, an active/active L3 switches 316-318 can communicate routes using OSPF 314 between two upstream devices (e.g. an Edge device) using OSPF 314 and a CE router 310. CE router 310 redistribute MPLS BGP routes 302, 306 into OSPF routes 314. It is noted that network 300 includes the notion of a single WAN link (e.g. MPLS) is accessible via two routed interfaces. In order to support this, a virtual IP address can be provisioned inside the edge and used in OSPF advertisement.

Figure 4:
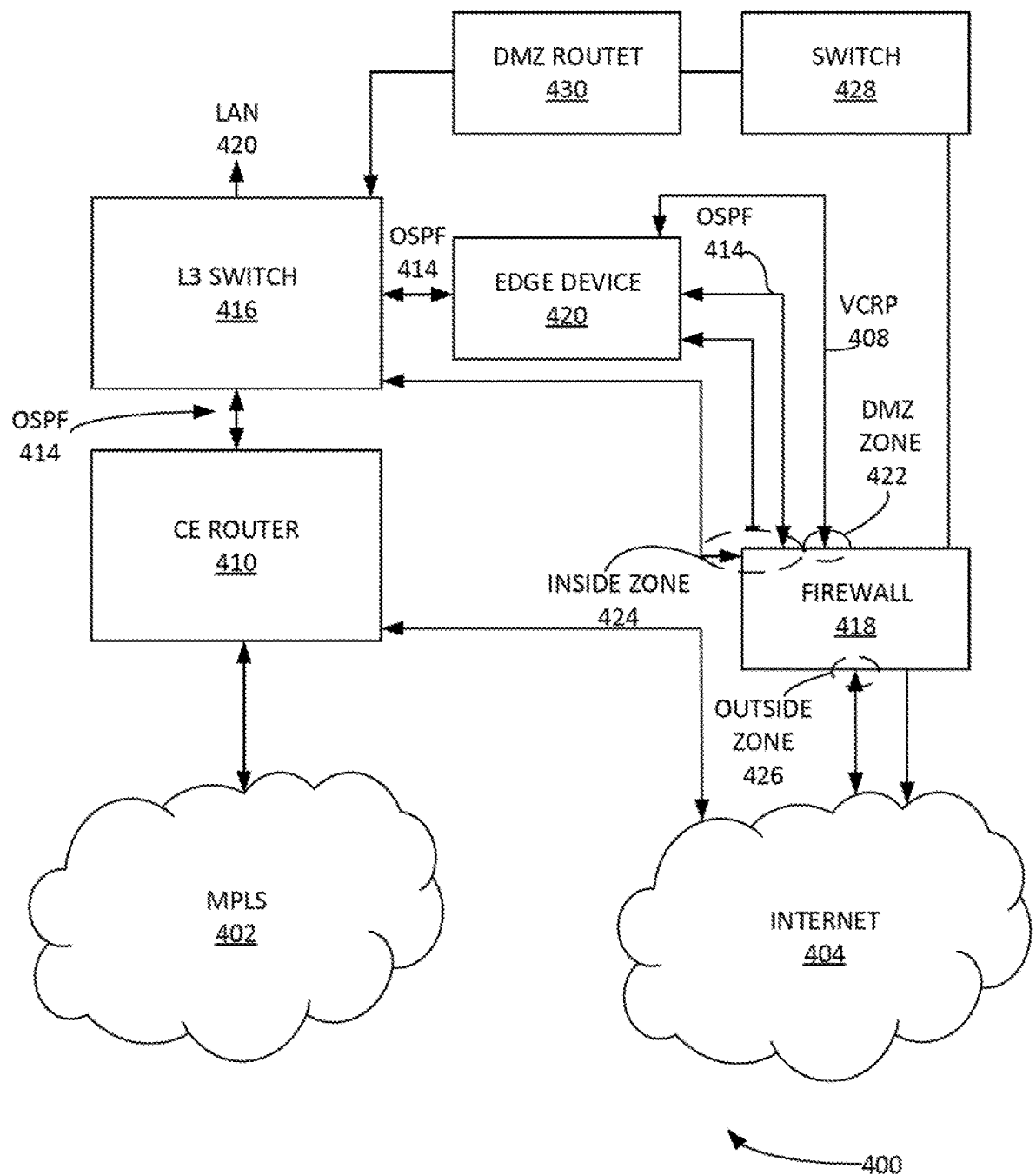
FIG. 4 illustrates another example network for implementing Overlay Flow Control, according to some embodiments.

FIG. 4 illustrates another example network 400 for implementing Overlay Flow Control, according to some embodiments. Network 400 can implement Overlay Flow Control in a datacenter site. A datacenter can have a distinct separation between the MPLS core and DMZ switch. The L3 switch can be talking OSPF and can be used for route learning and injection. The firewall within the DMZ can use routes injected via OSPF (though none may be learned) to ensure that returning Internet traffic is routed symmetrically.

Figure 5A:
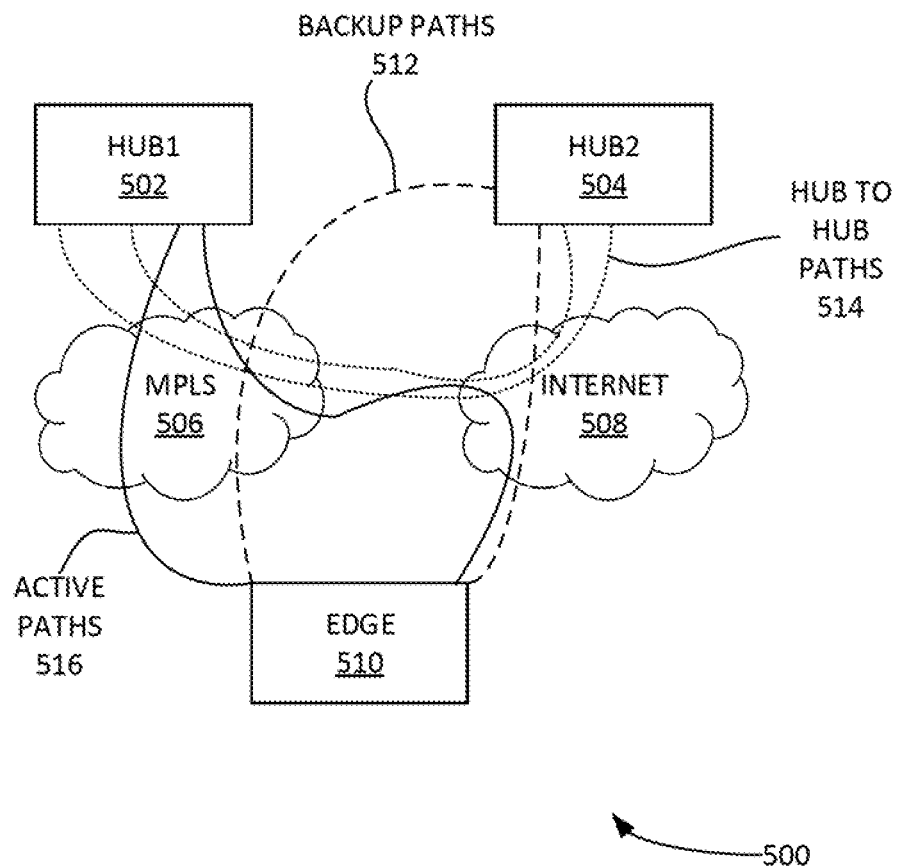
FIGS. 5 A-B illustrate an example topology of two data centers can be configured as edge-to-edge VPN hubs, according to some embodiments.
Figure 5B:
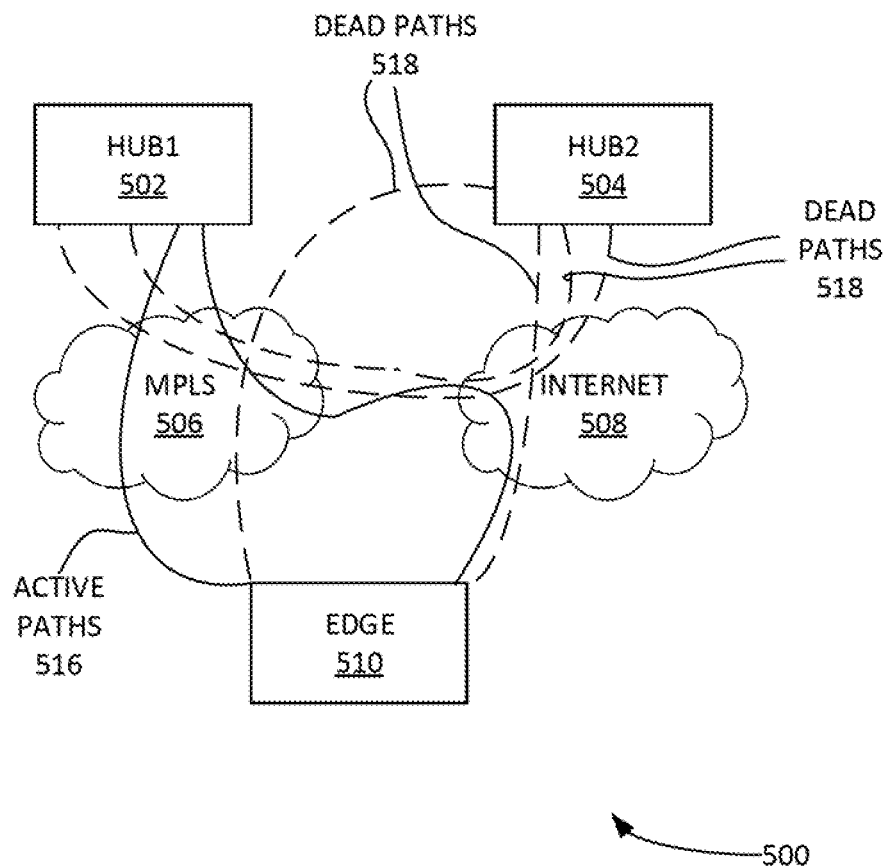

FIGS. 5 A-B illustrate an example topology 500 of two data centers can be configured as edge-to-edge VPN hubs, according to some embodiments. Example topology 500 can include redundant data centers which advertise the same subnets with different costs. In this scenario, both data centers (e.g. a primary datacenter and a backup datacenter, etc.) can be configured as edge-to-edge VPN hubs 502 and 504. As all edges connect directly to each hub 502 and 504 (e.g. via MPLS 506 and/or Internet 508) using paths 516, hubs 502 and 504 can also connect directly to each other using paths 514. Based on a route cost value, network traffic can be steered to the preferred active datacenter.

The customer can indicate whether routes are preferred (e.g. VeloCloud® Overlay becomes the default path with MPLS 506 as a backup) and/or non-preferred (e.g. where MPLS 506 remains the default path with VeloCloud® Overlay as a backup). The route costs for preferred, non-preferred and/or default routes can be configurable. For example, they can have different defaults based on whether OE1 or OE2 routes are used in the redistribution.

In one example, a CE Router can advertise an OE2 route. For routes with cost 'n' (where 'n>1'), it can be advertised with cost 'n−1'. For routes with cost '1', it can be advertised with cost '1' and a link cost 'm−1', where 'm' is the link cost from the L3 Switch/Router to the CE router.

In another example, CE Router advertises an OE1 route. Take the OE1 route cost as 'n'. The link cost can be obtained from the L3 Switch/Router to the CE router as 'm'. It can be advertised a route with cost 'n-prime' and link cost 'm-prime' such that ('n-prime'+'m-prime')<('n+m').

Figure 6A:
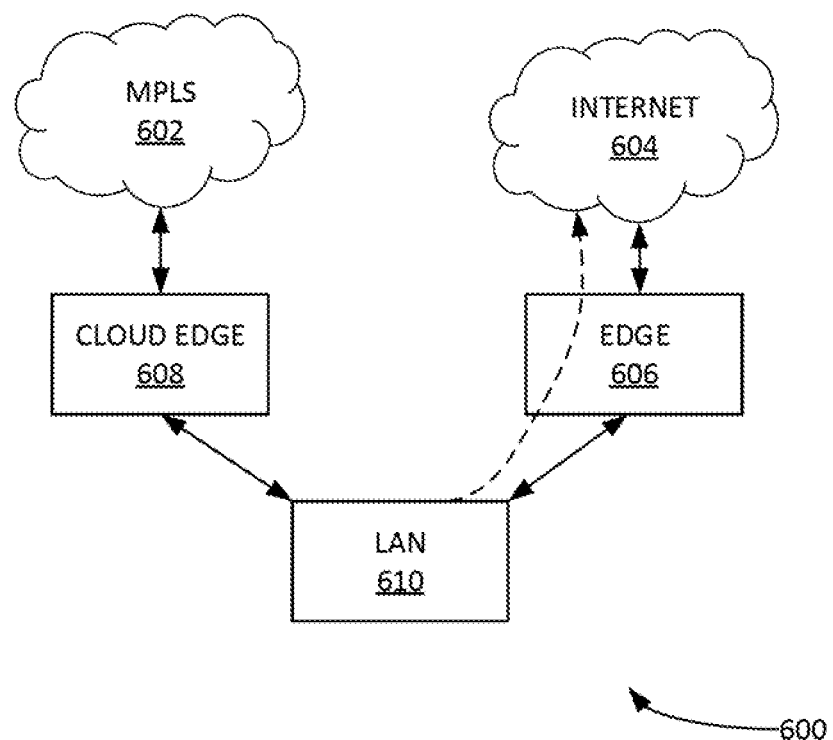
FIGS. 6 A-B illustrate example failover behaviors for preferred and non-preferred routes, according to some embodiments.
Figure 6B:
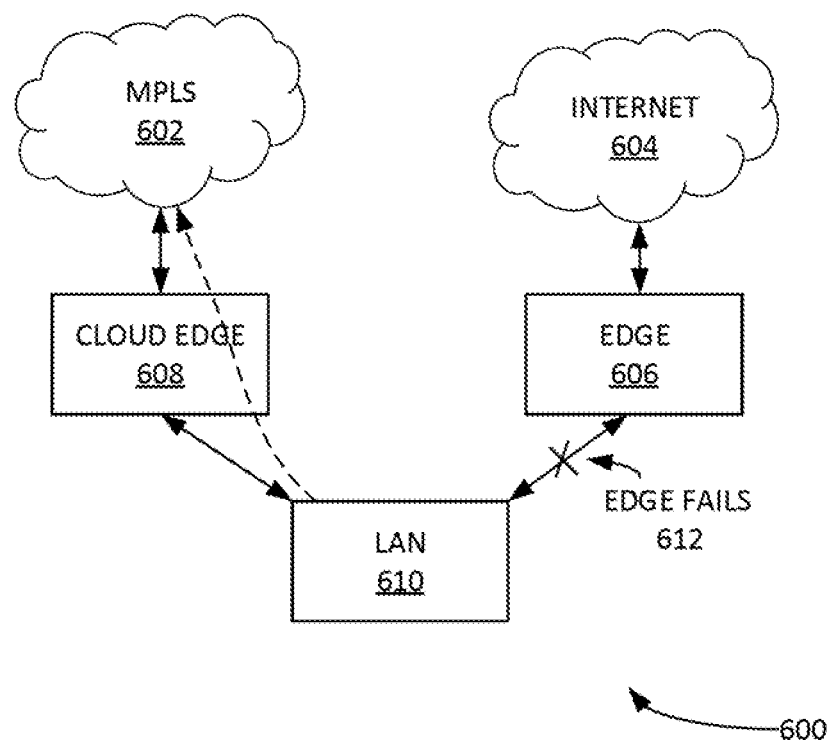
Figure 7A:
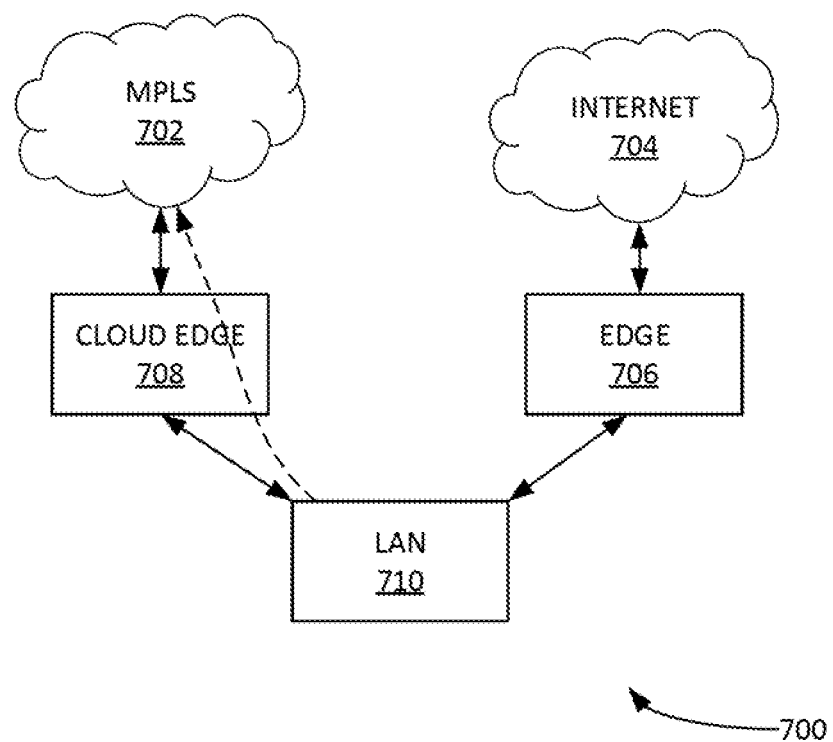
FIGS. 7 A-B illustrate example failover behaviors for preferred and non-preferred routes, according to some embodiments.
Figure 7B:
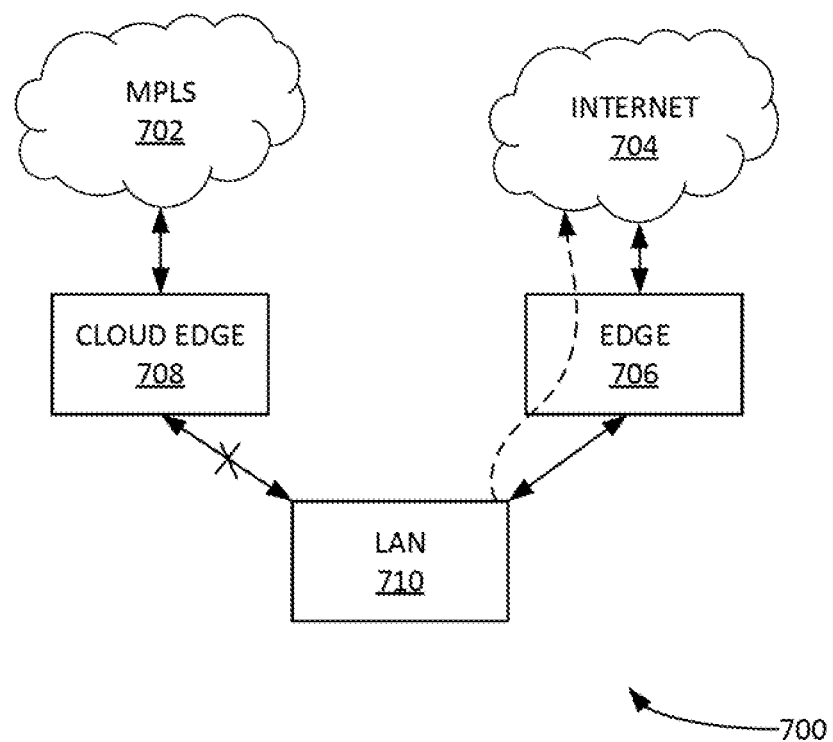

FIGS. 6 A-B illustrate example failover behaviors for preferred and non-preferred routes, according to some embodiments. FIGS. 7 A-B illustrate example failover behaviors for preferred and non-preferred routes, according to some embodiments.

It is noted that though route costs can be calculated for preferred and non-preferred routes (e.g. as provided supra), for simplicity they are presented below as 'n' for CE router cost, 'n−1' for a preferred route cost and 'n+1' for a non-preferred route cost.

To simplify the visualization and management of routes, they can be presented in an Overlay Flow Control table (e.g. see FIG. 9 infra). This table provides an enterprise-wide view of routes, routing adjacencies and preferred exits for each specific route. The preferred exit for any given route can be selected which can result in the routing preferences being automatically updated at each Edge device and advertised to influence routing changes across the network without the customer having to perform any further configuration actions. An edge device can implement the following rules for redistributing VCRP into OSPF. First, an edge device can redistribute VCRP prefixes that belong to various bronze sites as OE1, metric <m> if VCRP route preference is lower than DIRECT (if available) route preference. Else the prefixes are redistributed as OE2, metric <m> where m=low priority. A Direct route preference can be fixed to two-hundred and fifty-six (256). A VCRP route preference lower than 256 can indicate a route as a preferred route otherwise a Direct rout (if available) is preferred. The system can watch out for how CPE's redistribute this prefix into the MPLS cloud. The system can determine if the metric type is preserved by BGP attributes while redistributing into OSPF. The system can determine if the cost is preserved by BGP attributes while redistributing into OSPF.

Route insertion rules can be implemented. Routes can be inserted into a unified routing table based on the type of VPN profile configured. Hubs can setup direct routes for all VCRP prefixes. Branches can setup direct routes for prefixes via CG and/or VPN-hubs and/or DE2E direct route. For the same prefix, there can be two routes per transit point. This can be because the prefix is advertised by the owner and the hub. A first route can have a next_hop logical ID as transit point and destination logical ID as the owner. A next route can have a next hop logical ID and/or destination logical ID as VPN hub (e.g. not applicable for CG and DE2E).

A first example use case can include provisioning an edge device inside a datacenter location that previously did not contain one. In this example, Hub1 can be inserted into the Datacenter site as shown in the picture with a routed interface connected to 1.3 switch and the other WAN link connected to the Internet. The leg connecting 1.3 switch and Hub1 can have OSPF enabled. Hub1 can advertise default route 0.0.0.0/0 (originate-default) with metric 0 to L3 switch. This can allow Hub1 to take over Internet traffic sourced by subnets connected to L3 switch. Route H can have been learned as intra-area route (O). Route 'S' can have been learned as external type route (e.g. OEx). Route H and Route S can be added to OSPF view and are sent to VCO for GNDT sync up. Hub1 can be marked as owner of prefix 'H' and VCO responds to Hub1 with advertise flag set to True for prefix 'H'. Sites that advertise intra-area (O) or inter-area (IA) routes can be marked as owner of the routes in GNDT and can be allowed to advertise the routes to VCG. VCO can respond to Hub1 with advertise flag set to False for prefix 'S' as 'S' is an external-route and requires administrator's intervention. Hub1 can advertises route 'H' to VCG through VCRP.

In a second use-case example, a Bronze site can be brought online. It is noted that the as a prerequisite, the Datacenter are already be online. A Bronze1 site (e.g. a simple branch office site with only Internet connections and no MPLS or dynamic routing protocols such as OSPF in use at the site) can be provisioned and connected to VCG through an Internet link. Bronze1 site can advertise route 'B' to VCG through VCRP. VCG can be a reflector that reflects route 'B' to Hub1 with Bronze1 site as next hop and can reflect route 'H' to Bronze1 site with Hub1 site as next hop.

In a third use-case example, a Silver site (e.g. a branch office site containing a hybrid of MPLS and internet WAN links as well as an L3 device which is learning and advertising routes via OSPF) can be brought online. It is noted that the as a prerequisite, the Datacenter and associated Bronze site are already be online. Silver1 site can be stood up and connected to VCG through an Internet link. Silver1 site can learn routes 'H' and 'B' through VCG and install the learned sites into a unified route table. For example, Silver1 site can learn routes 'S' as an intra-area and routes 'H' and 'B' as external routes (e.g. from L3 switch). Routes 'S', 'H', and 'B' can be added to OSPF View and are communicated to VCO for GNDT synchronization. VCO responds with advertise flag set to 'True' for prefix 'S' but set to False for prefix 'H' and 'B'. Silver1 can advertise 'S' to other branches via VCG over VCRP.

In a fourth use-case example, a Legacy site route advertisement can be implemented. It is noted that the as a prerequisite, the Datacenter and associated Bronze and Silver sites are already online. Legacy site route 'L' can be learned by Hub1 site and Silver1 site as external route (e.g. OEx). Hub1 and Silver1 can communicate route 'L' to VCO for GNDT synchronization. Hub1 can be chosen as owner for the external route 'L'. (e.g. without administrator intervention). Hub1 can advertise route 'L' to other branches via VCG over VCRP. This can enable connectivity between legacy site 'L' and bronze1 site 'B'.

Various examples of hybrid sites distributing routes learned through VCRP into OSPF are now discussed. In a first example, a hybrid site on receiving route 'R' over VCRP can redistribute 'R' to L3 switch as external route based on various criteria. VeloCloud® (B2B) can be set as preferred. Route 'R' can be revoked if it was installed with metric type OE2. Route 'R' can be redistributed with metric type OE1, metric 'M'=1; etc. Accordingly, the L3 switch can be programmed with route 'R' pointing to an edge device (e.g. a Velocloud® edge, etc.). Additionally, OE1 can provide the adjacent routers to add cost to route 'R' as the routes get redistributed further and thus may not impact the route priority for this route 'R' on other receiving sites. In one example, Silver1 can install route 'R' with metric 1, metric type OE1. This route 'R' can be installed as the high priority route on adjacent L3 router(s). However, when this route 'R' reaches another hybrid site. For example, Datacenter site can see that the route 'R' with metric>one (1). Accordingly, this does not affect the route 'R' on adjacent L3 routers of Datacenter site that can be pointing to Datacenter site as next hop.

A Direct criterion can be set as preferred when it is available. In one example, route 'R' can be revoked if it was installed with metric type OE1, metric 'M'=one (1). Route 'R' can be redistributed with metric type OE2, metric 'M'=cost of 'R'+<low_prio_offset>. <low_prio_offset> can be some value that installs the route as low priority route. The value can be updated based on lab experiment.

Hybrid site redistributing 'R' to L3 switch can enable connectivity between 'R' and 'B' over VeloCloud® B2B overlay. The VeloCloud® B2B Overlay is the VeloCloud® Edge and Gateway multipath system that was defined in the original patent providing multipath VPN connectivity between sites. Additionally, it allows connectivity between legacy sites 'L' and 'B' over private links and Velocloud B2B overlay.

Various examples of a gateway (e.g. a VeloCloud® Gateway, etc.) distributing routes learned through a routing protocol (e.g. VCRP) into BGP are now discussed. In a first example, a gateway receiving route 'R' over VCRP can redistribute 'R' to the adjacent L3 router(s) as a BGP route based on various criteria. Based on the gateway precedence, different gateway(s) can automatically redistribute with different priorities to influence steering of traffic to the preferred gateway. In one example, gateway 1 can redistribute route 'R' with MED 10 and gateway 2 can redistribute route 'R' with MED 20. In another example, a less preferred gateway 2 can send 'R' with automatic AS-path-prepend to effectively make gateway 1 preferred. In another example, the user may specify BGP communities in a priority-order (e.g. based on their mapping to local-preference on the provider-edge (PE) router side (e.g. a provider-edge router can be a version of a CE router that sits on the provider's edge instead of the customer's edge, etc.). Gateway 1 can then automatically redistribute route 'R' with a community value from this ordered list which is more preferred than the community value chosen on the route redistributed by gateway 2.

To facilitate ease of deployment of transit and non-transit edges (and/or to better categorize routes which are not local to an edge (e.g. routes learned from a separate autonomous system e.g. MPLS)), a new concept Uplink can be provided/implemented. A user may tag routes as Uplink for OFC driven preference/filtering purposes. In one example, user marks a BGP neighbor as Uplink and all routes learnt from this peer are tagged as Uplink (e.g. when replacing MPLS Customer Edge Router with a VeloCloud® Edge, etc.). In another example, the user can set a specific community value for routes not local to the Edge and configures that community value on the Edge BGP config as Uplink Community. Then any BGP learned route that has that community value, can be considered Uplink route. The OFC then provides global configuration options for Uplink routes that the user can use to easily control route propagation without manipulating routes individually.

Additional Exemplary Computer Architecture and Systems

Figure 8:
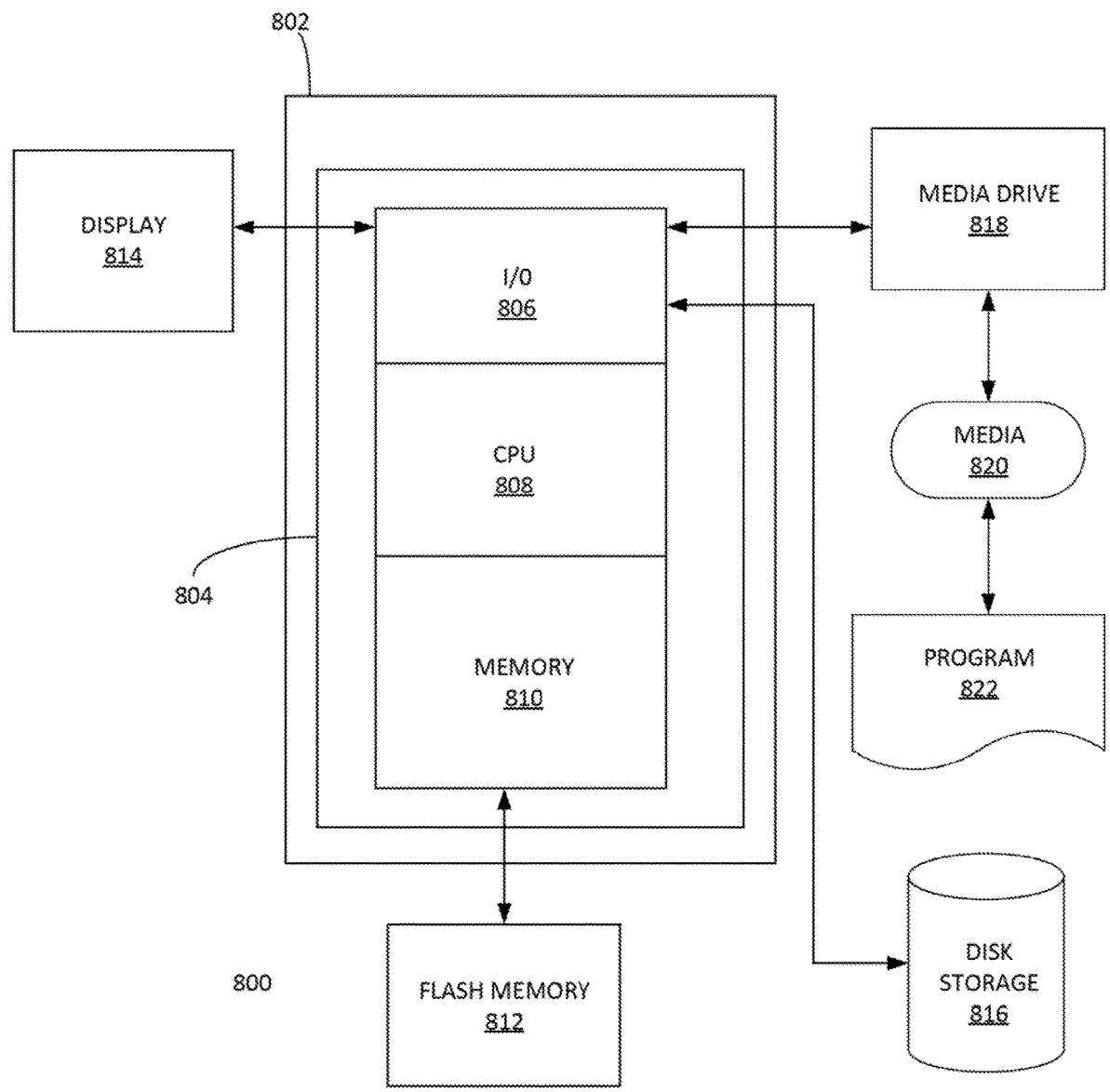
FIG. 8 depicts an exemplary computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or other user input (not shown), a disk storage unit 816, and a media drive unit 818. The media drive unit 818 can read/write a computer-readable medium 820, which can contain programs 822 and/or data. Computing system 800 can include a web browser. Moreover, it is noted that computing system 800 can be configured to include additional systems in order to fulfill various functionalities. Computing system 800 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

FIG. 9 illustrates an example screen shot 900 of an Overlay Flow Control table, according to some embodiments. Overlay Flow Control table can be a user interface on the Orchestrator. Screen shot 900 displays all routes in the customer system. Overlay Flow Control table allows for editing routing attributes, preferred exits, and default behaviors for future learned routes.

Figure 10:
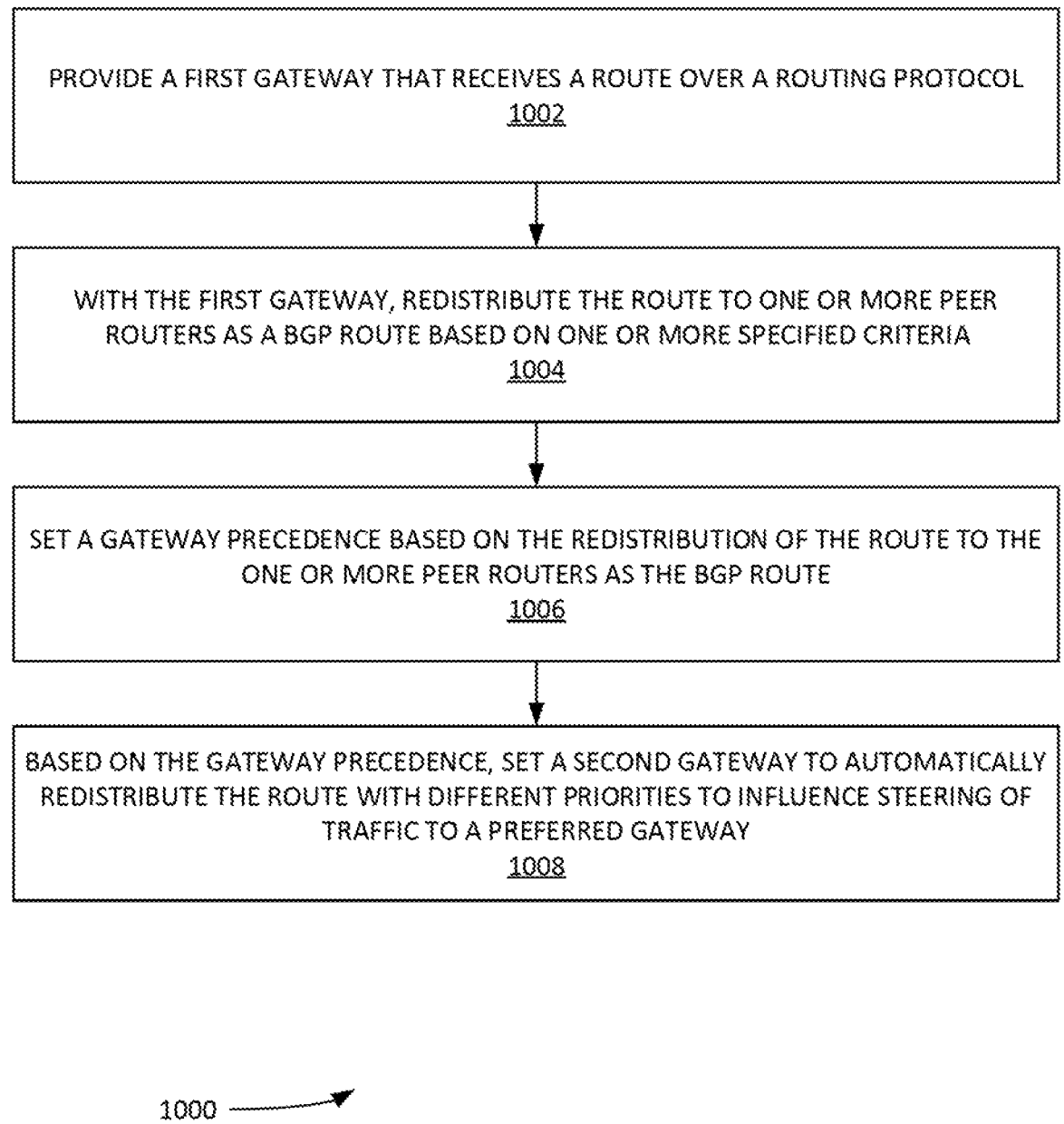
FIG. 10 illustrates an example process for overlay flow control, according to some embodiments.

FIG. 10 illustrates an example process 1000 for overlay flow control, according to some embodiments. In step 1002, process 1000 can provide a first gateway that receives a route over a routing protocol. In step 1004, process 1000 can, with the first gateway, redistribute the route to one or more peer routers as a BGP route based on one or more specified criteria. In step 1006, process 1000 can set a gateway precedence based on the redistribution of the route to the one or more peer routers as the BGP route. In step 1008, process 1000 can, based on the gateway precedence, set a second gateway to automatically redistribute the route with different priorities to influence steering of traffic to a preferred gateway. A peer router can be a router configured to be a peer to an edge router (e.g. a VeloCloud® edge, etc.) on a LAN. For example, a peer router can be an adjacent peer routers layer three (L3) router. It is noted that an edge device can be utilized in lieu of and/or as a gateway in some embodiments. For example, an edge device can redistribute the route as a BGP route or an OSPF (Open Shortest Path First) route.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method for using routes in an overlay network created over at least one public cloud datacenter in which a gateway is deployed, the overlay network implemented by the gateway and a set of edge devices outside of the public cloud datacenter, the method comprising:
   at a location comprising at least one edge device outside of the public cloud datacenter:
      receiving a first route through the overlay network that is of a first type and that is translated from a second-type route, and a priority level for the first route;
      receiving a second route through the overlay network that is of the first type and that is translated from a third-type route, and a priority level for the second route;
      using the received priority levels to determine, for a received packet, whether the first route or the second route is preferable to send the packet to a destination of the packet through the overlay network;
      when the first route is preferable, forwarding the packet along the first route to the destination; and
      when the second route is preferable, forwarding the packet along the second route to the destination.

2. The method of claim 1, wherein the first and second routes are identified by first and second edge devices at the location.

3. The method of claim 2, wherein the first edge device is an edge device connected to a multi-protocol label switching (MPLS) network, while the second edge device is an edge device connected to the Internet.

4. The method of claim 1, wherein the first-type route comprises interior gateway protocol (IGP) routes.

5. The method of claim 4, wherein the IGP routes comprise open shortest path first (OSPF) routes.

6. The method of claim 4, wherein one of the second-type route and the third-type route is a border gateway protocol (BGP) route, while the other of the second-type route and the third-type route is a route based on a proprietary cloud based routing protocol.

7. The method of claim 1, wherein:
   the first and second routes are identified by first and second edge devices at the location that provide the first and second routes to a switch at the location; and
   the switch uses the priority levels to make the determination and forwarding the packet based on the determination.

8. The method of claim 7, wherein:
   the overlay network is defined for an entity having a local area network (LAN) at the location; and
   the LAN comprises the switch through which the LAN connects to the first and second edge devices.

9. The method of claim 8, wherein the first edge device connects to a multi-protocol label switching (MPLS) network, and the priority levels define the first route through the first edge device as a backup route to the second route for the destination.

10. The method of claim 9, wherein the location is a branch office of an entity.

11. A non-transitory machine readable medium storing a program for execution by a set of processing units, the program for using routes in an overlay network created over at least one public cloud datacenter in which a gateway is deployed, the overlay network implemented by the gateway and a set of edge devices outside of the public cloud datacenter, the program comprising sets of instructions for:

at a location comprising at least one edge device outside of the public cloud datacenter:

receiving a first route through the overlay network that is of a first type and that is translated from a second-type route, and a priority level for the first route;

receiving a second route through the overlay network that is of the first type and that is translated from a third-type route, and a priority level for the second route;

using the received priority levels to determine, for a received packet, whether the first route or the second route is preferable to send the packet to a destination of the packet through the overlay network;

when the first route is preferable, forwarding the packet along the first route to the destination; and when the second route is preferable, forwarding the packet along the second route to the destination.

12. The non-transitory machine readable medium of claim 11, wherein the first and second routes are identified by first and second edge devices at the location.

13. The non-transitory machine readable medium of claim 12, wherein the first edge device is an edge device connected to a multi-protocol label switching (MPLS) network, while the second edge device is an edge device connected to the Internet.

14. The non-transitory machine readable medium of claim 11, wherein the first-type route comprises interior gateway protocol (IGP) routes.

15. The non-transitory machine readable medium of claim 14, wherein the IGP routes comprise open shortest path first (OSPF) routes.

16. The non-transitory machine readable medium of claim 14, wherein one of the second-type route and the third-type route is a border gateway protocol (BGP) route, while the other of the second-type route and the third-type route is a route based on a proprietary cloud based routing protocol.

17. The non-transitory machine readable medium of claim 11, wherein:

the first and second routes are identified by first and second edge devices at the location that provide the first and second routes to a switch at the location; and the switch uses the priority levels to make the determination and forwarding the packet based on the determination.

18. The non-transitory machine readable medium of claim 17, wherein:

the overlay network is defined for an entity having a local area network (LAN) at the location; and the LAN comprises the switch through which the LAN connects to the first and second edge devices.

19. The non-transitory machine readable medium of claim 18, wherein the first edge device connects to a multi-protocol label switching (MPLS) network, and the priority levels define the first route through the first edge device as a backup route to the second route for the destination.

20. The non-transitory machine readable medium of claim 19, wherein a demilitarized zone (DMZ) is implemented between the second edge device and the Internet in order to ensure return traffic from the Internet is routed symmetrically.

* * * * *